US006871781B1

(12) United States Patent
S.

(10) Patent No.: US 6,871,781 B1
(45) Date of Patent: Mar. 29, 2005

(54) PHOTO IDENTIFICATION COLLECTION ASSEMBLY

(76) Inventor: Carlos Gamero S., 1001 Brickell Bay Dr., Miami, FL (US) 33131

( * ) Notice: Subject to any disclaimer, the term of this patent is extended or adjusted under 35 U.S.C. 154(b) by 0 days.

(21) Appl. No.: 10/078,047

(22) Filed: Feb. 8, 2002

(51) Int. Cl.$^7$ ............................................... G06F 17/60
(52) U.S. Cl. ....................................... 235/379; 359/210
(58) Field of Search ............................... 235/379, 380; 359/210, 362, 368

(56) References Cited

U.S. PATENT DOCUMENTS 6,005,704 A * 12/1999 Chmielewski, Jr. et al. 359/210

* cited by examiner

Primary Examiner—Diane I. Lee
Assistant Examiner—Lisa M. Caputo
(74) Attorney, Agent, or Firm—Malloy & Malloy

(57) ABSTRACT

An improved photo identification collection assembly includes a base portion, having a stage, and a support member structured to engage the base portion. A plurality of image collectors, each having a corresponding lens, engage the support member. Each image collector is disposed to focus on an object positioned inside of either a primary stage area, a secondary stage area, or outside of either the primary or secondary stage areas. In addition, the assembly incorporates an image actuator which is structured to generate an actuator signal and communicate the signal to each image collector. Additionally, the actuator signal is designed to cause the plurality of image collectors to simultaneously collect data. Also, the assembly includes a data storage unit which receives and stores the data from the image collectors, and is further structured to permit access and retrieval of the collected data.

33 Claims, 3 Drawing Sheets

PHOTO IDENTIFICATION COLLECTION ASSEMBLY

BACKGROUND OF THE INVENTION

1. Field of the Invention

An improved photo identification collection assembly incorporating a plurality of image collectors structured to simultaneously collect data associated with a specific transaction. The assembly includes an image actuator structured to generate an actuator signal, the actuator signal causing each of the plurality of image collectors to simultaneously collect data, thus providing a verifiable and authenticatable correlation between various elements associated with a specific transaction. The assembly further includes a data storage unit structured to retrieve and at least temporarily store the data from the image collectors for access by one or more viewing devices, thus making the assembly substantially portable and versatile.

2. Description of the Related Art

Since the time when businesses began accepting documents such as checks as payment for goods and/or services rendered and/or as verification of a transaction as in the case of transportation tickets, there have been those who have taken advantage of this practice for their own ill-gotten gains. Specifically, document fraud, such as check fraud, began, and to this day it continues to have a serious negative impact on the bottom line of numerous businesses throughout the world, as goods are provided to and/or services are rendered for a person or persons who, in return, present the provider with a check or other document that has been fraudulently generated. This may be due to, among other reasons, insufficient funds in the account, use of a lost or stolen check for which a stop payment request has been issued, or a forged and/or counterfeit check. While the law provides a business, as well as individuals, with recourse against persons who commit such document fraud, the process is costly and time consuming. As such, in many cases businesses simply cannot justify the time or expense required to bring the guilty parties to justice and to try to recover their economic losses.

In addition to check fraud, along with the significant increase in the acceptance of credit cards, and more recently debit cards, by numerous businesses throughout the world, the reported instances of credit card fraud have also significantly increased. As is the case with check fraud, while a business harmed by such an act has recourse to the law, it is often time and/or cost prohibitive to enforce and, therefore, credit card fraud has become an even more attractive scheme to the people who perpetrate such crimes.

Initial attempts to address the problems associated with check and credit card fraud included a common tactic, employed by many businesses, which is to require that a customer, who is otherwise unknown to them, produce some form of photo identification, and in many cases, some form of government issued photo identification, to verify that the name on the check or credit card corresponds to the name on the photo identification, and that the photo appears to be of the person presenting it. Additionally, in many instances, at least some of the relevant information contained on the photo identification, such as a driver's license or telephone number, may be written directly on the check or credit card transaction slip. However, as these techniques began to be employed, the people committing these fraudulent acts simply produced fraudulent photo identification cards to accompany the checks and/or credit cards they improperly, and illegally, presented as payment.

A further measure implemented by a number of businesses, initially and primarily in banking institutions, is the utilization of some form of photo collection device or devices strategically located in a facility, such as closed circuit television cameras. While these are often effective to prove that a certain person was in a certain place at a certain time, they generally are not designed to capture the person's activities in detail, such as the signing of a specific check or a specific credit card receipt. Without concrete proof of unity of a person and a fraudulent instrument, such as a check or credit card receipt, insurance carriers, with whom many businesses contract with to insure against loss due to fraud, are not willing to compensate the victim's business for many losses. A main reason for this is that the closed circuit images do not provide sufficient proof for the insurance carriers to recover their losses via subsequent legal action.

A modification of this concept, specifically intended to address the issue of check and credit card fraud, is the use of a conventional camera to take a person's picture at the time they make a purchase with a check or credit card. This system presents several problems, the first being simply the expense of taking a photograph of every person wishing to make a purchase by check or credit card. In addition, as noted above, the simple fact that a photograph of the person is taken at the time of a transaction does not provide sufficient unity of the person and the fraudulent instrument to allow the business owner, or their insurance carrier, to effectively proceed with legal action against the person(s) who committed the fraudulent act.

More recently, identification concerns have dramatically risen with respect to national security and/or safety measures. This is due in part to the apparent use of fraudulent identification documents and associated airline tickets by terrorists and other criminals. In addition to the nation's airports, the government has indicated the need to strictly monitor persons entering other sensitive facilities throughout the nation, such as federally owned buildings and landmarks, federal, state and local courthouses, prisons, power generating plants, chemical processing facilities, etc. While a variety of methods and devices exist for monitoring persons entering, and in some instances, exiting, such facilities, none has provided an effective and efficient means to maintain an accurate record, such as by capturing a person's photograph, while at the same time recording an image of the identification and/or other documents which they presented to gain access to such facilities.

As such, it would be highly beneficial to provide an efficient and cost effective assembly to record a person's financial transactions and/or their entry and exit from sensitive facilities. In particular, it would be helpful to provide an assembly which could record the image of the person completing the transaction or entering a facility, as well as the executed monetary instrument, airline or other transportation ticket, and/or other relevant documentation, such as some form of photo identification, simultaneously. Further, it would be preferable if such an assembly were self contained and portable such that it could easily and effectively be staged and utilized at any location deemed to require such monitoring. Also, it would be beneficial for such an assembly to be capable of storing a large volume of the images it collects, such that they are accessible for review via one or more viewing devices, either though a local connection to the assembly, or by remotely accessing the assembly via a network connection. Furthermore, such an assembly should be durable, affordable, and low maintenance so it provides an opportunity for anyone requiring such an assembly to make avail of its full potential for deterring the aforementioned unsavory activities, and should be capable of effective connection and/or communication with other remote or local facilities for subsequent and/or contemporaneous verifications and authentication.

SUMMARY OF THE INVENTION

As previously noted, the present invention relates to an improved photo identification collection assembly. This improved assembly includes a base portion having a support member structured to engage the base portion. In addition, the base portion includes a stage operatively associated therewith, such as for the placement of documents and the like. The stage may include at least a primary alignment indicator which at least partially defines a primary stage portion. In at least one embodiment of the present invention, the stage may also include a secondary alignment indicator which at least partially defines a secondary stage portion, as discussed in greater detail below.

An image collection assembly is provided which includes at least a first image collector and a second image collector. Each of the first and second image collectors include a corresponding first and second lens. Moreover, in at least one embodiment of the present invention, the image collection assembly further includes a third image collector, having a corresponding third lens. Each image collector is disposed in engaging relation with the support member. More specifically, each image collector engages the support member such that the first image collector is disposed to at least focus on an object positioned inside of the primary stage area, the second image collector is disposed to at least focus on an object positioned inside of the secondary stage area, and the third image collector is disposed to at least focus on an object positioned outside of the primary and secondary stage areas.

The present invention further comprises an image actuator, wherein the image actuator is communicatively associated with at least the first and second image collectors. In at least one embodiment, the image actuator is structured to generate an actuator signal, and to communicate the actuator signal to the image collectors. Further, the actuator signal causes the image collectors to simultaneously collect data.

Finally, the assembly of the present invention includes a data storage unit disposed in cooperative association with at least the first and second image collectors. The data storage unit is structured to receive and at least temporarily store data from the image collectors. Additionally, the data storage unit includes a data transfer mechanism which is structured to provide access to and retrieval of the data received from the image collectors by one or more viewing devices.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 5:
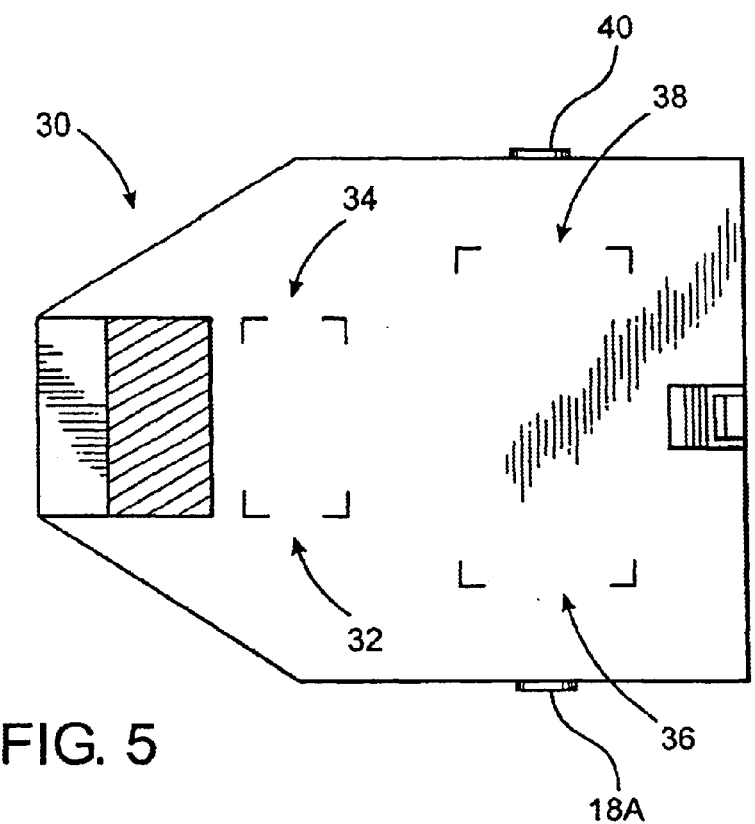
FIG. 5 is a plan view of a stage of the embodiment of FIG. 1 along line 5—5 thereof.
Figure 6:
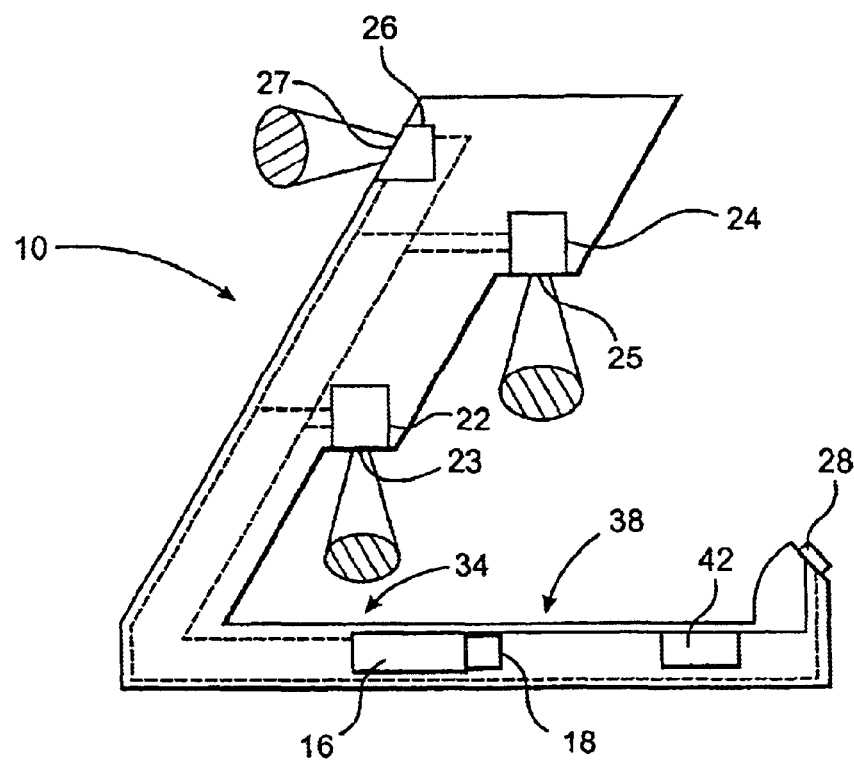
FIG. 6 is a schematic representation of one embodiment of the present invention.

The present invention is directed to an improved photo identification collection assembly, generally shown as 10 throughout the Figures. The assembly 10 includes a base portion 12, which includes a stage, generally shown as 30. The stage 30 includes a primary alignment indicator 32, which at least partially defines a primary stage area 34. Further, in at least one embodiment, the stage 30 also includes a secondary alignment indicator 36, which at least partially defines a secondary stage area 38, as illustrated in FIGS. 5 and 6. The primary and secondary alignment indicators 32 and 36 are disposed on the stage 30 by any one of a number of marking techniques, including, but not limited to, etching, painting, taping, overlaying, etc.

Figure 1:
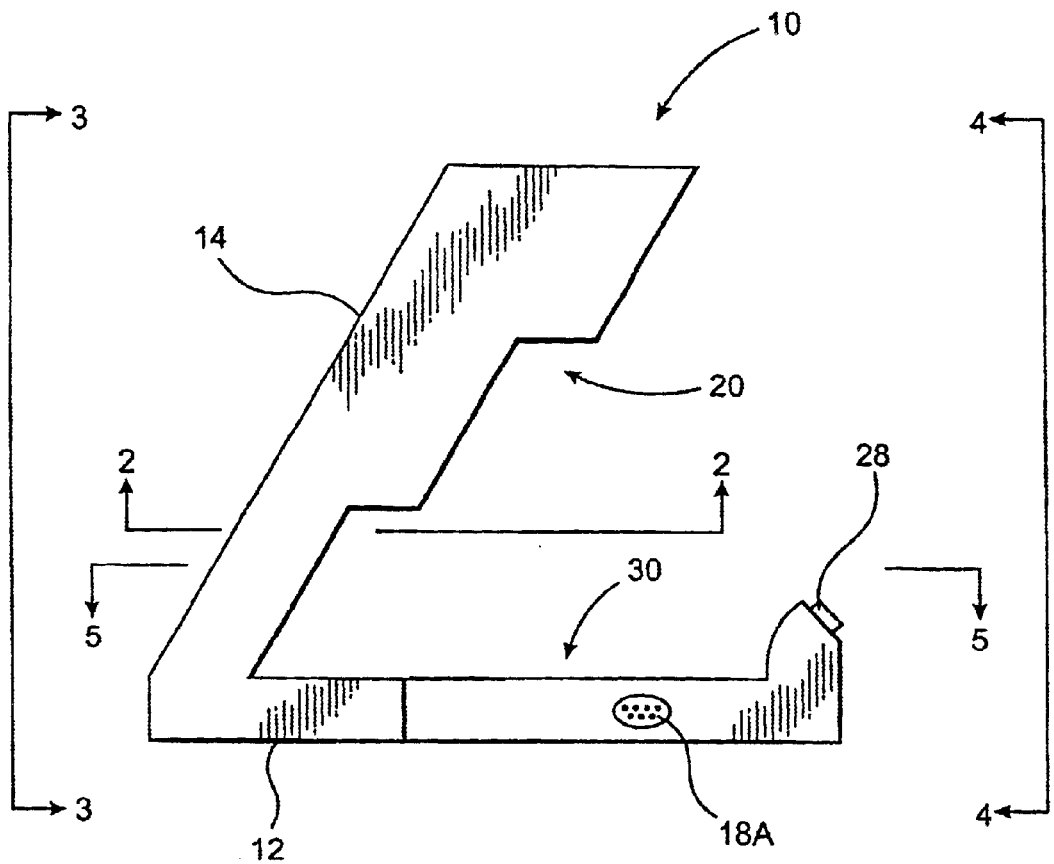
FIG. 1 is a side view of one preferred embodiment of the present invention.
Figure 2:
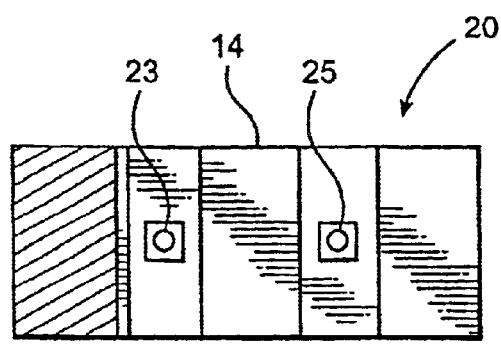
FIG. 2 is a partial cross sectional view of an image collection assembly of the embodiment of FIG. 1 along line 2—2 thereof.
Figure 3:
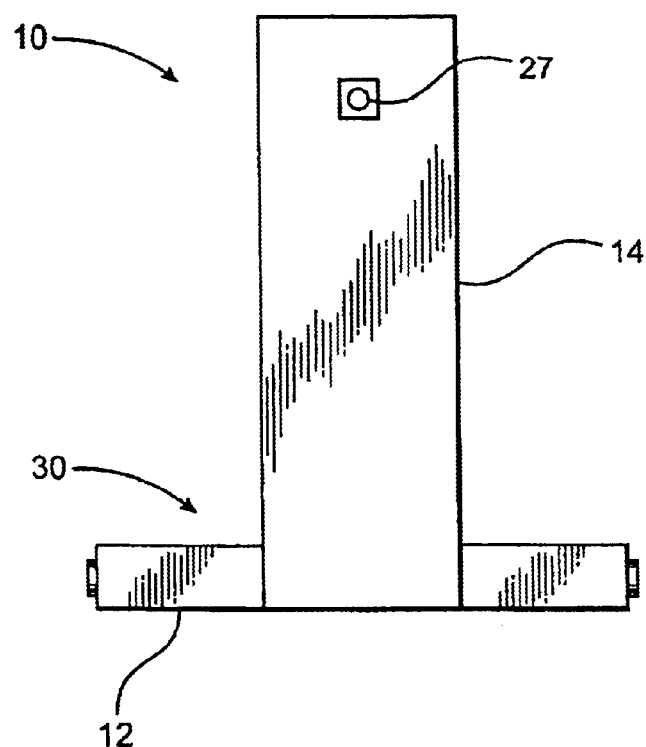
FIG. 3 is a rear view of the embodiment of FIG. 1 along line 3—3 thereof.
Figure 4:
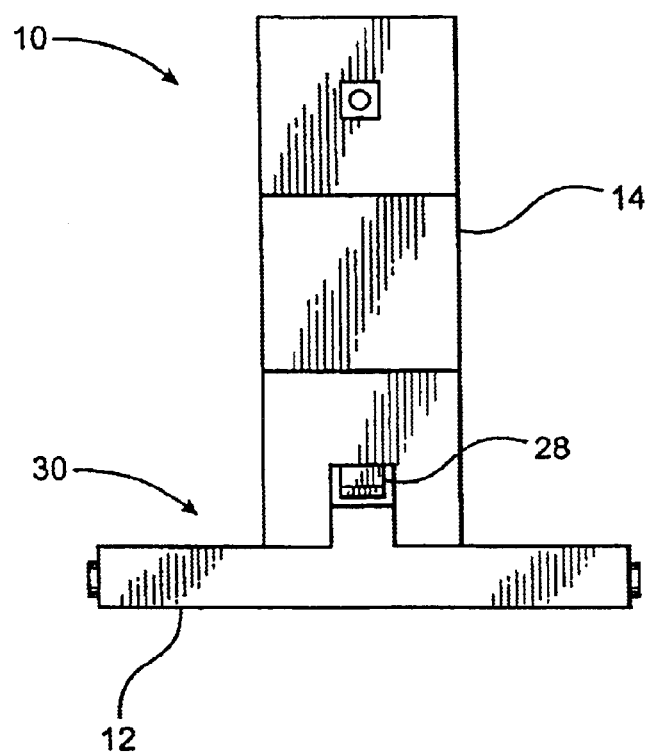
FIG. 4 is 4 is a of the embodiment of FIG. 1 along line 4—4 thereof.

A support member 14 is provided which is structured to engage the base portion 12. In at least one embodiment, the support member 14 is attached to the base portion 12 in an outwardly extending relation. More specifically, the support member 14 is attached to the base portion 12 such that at least a portion of the support member 14 is extending outward from the stage 30, as illustrated in FIG. 1, thereby at least partially defining the outwardly extending relation.

A preferred embodiment of the present invention incorporates an image collection assembly, generally shown as 20 in the Figures. The image collector assembly 20 includes at least a first image collector 22 and a second image collector 24. Each of the first and second image collectors 22 and 24 have a corresponding first lens 23 and second lens 25. In at least one preferred embodiment, the image collection assembly 20 further includes a third image collector 26 having a corresponding third lens 27, however, it is understood that an apparatus may encompass additional image collectors and still fall within the scope and intent of the present invention. The image collectors 22, 24, and 26 incorporated into the present invention include any device utilized to capture a photographic image of a person or an image of a document which can store the image as a retrievable data file. These include, by way of example only, digital cameras, which includes both still photographic cameras and digital video recorders, or closed circuit televison cameras, which comprise both analog and digital systems, among others. In addition, a preferred embodiment of the present invention incorporates image collectors 22, 24, and 26 which include the capacity to associate a date and time stamp with each image collection occurrence. As these types of devices have become increasingly more affordable and reliable, the resultant assembly 10 of the present invention is also, necessarily, affordable and reliable.

In at least one embodiment of the present invention, the first, second, and third image collectors 22, 24, and 26 are disposed in an engaging relation with the support member 14. A preferred embodiment includes the first, second, and third image collectors 22, 24, and 26 engaging the support member 14 such that each of the image collectors 22, 24, and 26 are supported and maintained in a spaced apart orientation. In this preferred embodiment, the image collectors 22, 24, and 26 are spatially positioned, as illustrated in FIG. 6, such that first lens 23, of the first image collector 22, is disposed to at least focus on an object positioned inside of the primary stage area 34, and the second lens 25, of the second image collector 24, is disposed to at least focus on an object positioned inside of the secondary stage area 38. FIG. 6 further illustrates that in this preferred embodiment, the third lens 27, of the third image collector 26, is disposed to at least focus on an object positioned outside of the primary stage area 34 and the secondary stage area 38. In this preferred embodiment, it is possible to record the visual image of the person completing a transaction or entering a facility, while simultaneously recording the visual image of one or more documents presented by that person at the time of the event. Further, as previously indicated, the image collectors 22, 24, and 26 of the present invention include the capacity to associate a time and date stamp with the visual images collected, thereby providing proof of unity of the person and the documentation produced.

The present invention also incorporates an image actuator 28 which communicatively associates with at least the first image collector 22 and the second image collector 24. The image actuator 28 is structured to generate an actuator signal including, but not limited to, mechanical, electrical, optical, or microwave signal modes. Additionally, the image actuator 28 is structured to communicate the actuator signal to at least the first and second image collectors 22 and 24 thereby causing the first and second image collectors 22 and 24 to simultaneously collect data. In a preferred embodiment, the image actuator 28 is structured to communicate the actuator signal to the first, second, and third image collectors 22, 24, and 26, thereby causing the first, second, and third image collectors 22, 24, and 26 to simultaneously collect data.

The image actuator 28 communicates the actuator signal to the image collectors 22, 24, and 26 by any one of a number of methods, dependent in part on the mode of the signal generated. For example, if the actuator signal is mechanical, then the image actuator 28 communicates the signal to the image collectors via a mechanical interconnection, such as, for example, a standard camera lens shutter release cable. Alternatively, if an electrical actuator signal is generated, the image actuator 28 communicates the actuator signal to the image collectors 22, 24, and 26 by way of a standard electrical wire connection. In the event the image actuator 28 generates a microwave actuator signal, the image actuator communicates with the image collectors 22, 24, and 26 via a wireless transmitter and receiver. As previously indicated, a number of actuator signal modes are contemplated by the present invention and, as such, a number of methods of communicating the actuator signal to the image collectors 22, 24, and 26 are also envisioned.

Another feature of the present invention is the incorporation of a data storage unit 16, which is cooperatively associated with at least the first and second image collectors 22 and 24 such that it can receive and at least temporarily store the data collected by the image collectors 22 and 24. At least one embodiment includes a data storage unit 16 cooperatively associated with the first, second, and third image collectors 22, 24, and 26. The data collected by the image collectors 22, 24, and 26 is received by the data storage unit 16 via, by way of example only, an electrical connection, a fiberoptic connection, or a wireless receiver, depending on the format of the data provided by the image collectors 22, 24, and 26. Other formats of data are envisioned to be utilized in the present invention, and as such, other methods of receiving data from the image collectors 22, 24, and 26 are also contemplated.

In a preferred embodiment, the data storage unit 16 is capable of storing the data collected simultaneously by the image collectors 22, 24, and 26 in either a single data file or in separate, individual data files. The data storage unit 16 incorporates any one of a number of standard devices utilized for the storage of large quantities of data, such as, by way of example only, a standard computer hard drive, a writable or rewritable compact disc drive, or a diskette or tape drive. Incorporation of any of the above mentioned devices for the data storage unit 16 allows the assembly 10 of the present invention to at least temporarily store a large volume of the images and data it collects. In a preferred embodiment, the data storage unit 16 is capable of storing at least 1.5 million image files.

In addition to receiving and at least temporarily storing data from the image collectors 22, 24, and 26, the data storage unit 16 is further structured to provide access to and allow the retrieval of the data it contains by way of a data transfer mechanism 18. Similar to the receipt of data from the image collectors 22, 24, and 26, the data transfer mechanism 18 transmits data by any one of a number of data transmission mediums including, but not limited to, electrical transmission, utilizing a standard computer data transfer port as illustrated at 18a in FIGS. 1 and 5, fiberoptic transmission, or wireless transmission, just to name a few. The data transfer mechanism 18 is further structured to permit access to and allow the retrieval of data by a single viewing device, such as a personal computer or a laptop computer. Alternatively, the data transfer mechanism 18 may be configured to permit access to and allow the retrieval of data by a plurality of viewing devices via, for example, a network connection.

At least one embodiment of the present invention requires a power source to operate. This may be provided by way of an external power source such as, for example, a standard electrical power source connected to the assembly 10 of the present invention via a standard power supply input 40, as illustrated in FIG. 5. Alternatively, the assembly 10 may incorporate an internal power supply 42, as illustrated in FIG. 6. The internal power supply 42 may be, by way of example only, a standard, single use battery, a rechargeable battery, or a solar powered photovoltaic cell. Either form of supplying power to the assembly 10 of the present invention allows the assembly 10 to be portable such that it is easily and effectively staged and utilized at virtually any location.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A photo identification collection assembly comprising:
a base portion, said base portion including a stage,
said stage comprising at least a primary alignment indicator structured to at least partially define a primary stage area, said primary stage area structured to receive a first object to be viewed thereon,
said stage further comprising a secondary alignment indicator structured to at least partially define a secondary stage area, said secondary stage area structured to receive a second object to be viewed thereon, a support member structured to engage said base portion, a first image collector including a first lens and disposed in engaging relation with said support member, a second image collector including a second lens and disposed in engaging relation with said support member, said first image collector supported by said support member such that said first lens is disposed to at least focus on the first object, said second image collector supported by said support member such that said second lens is disposed to at least focus on the second object, an image actuator communicatively associated with said first and second image collectors, and a data storage unit disposed in cooperative association with said first and second image collectors.

2. An assembly as recited in claim 1 wherein said support member is attached to said base portion in an outwardly extending relation.

3. An assembly as recited in claim 2 wherein said outwardly extending relation is at least partially defined by at least a portion of said support member extending outward from said stage.

4. An assembly as recited in claim 1 further comprising a third image collector having a third lens.

5. An assembly as recited in claim 4, wherein said third image collector is supported by said support member such that said third lens is disposed to at least focus on an object positioned outside of said primary and secondary stage areas.

6. An assembly as recited in claim 1 wherein said image actuator is structured to generate an actuator signal.

7. An assembly as recited in claim 6 wherein said image actuator communicates said actuator signal to each of said first and second image collectors, said actuator signal causing said first and second image collectors to simultaneously collect data.

8. An assembly as recited in claim 7 wherein said image actuator communicates said actuator signal to said first and second image collectors via a mechanical interconnection.

9. An assembly as recited in claim 7 wherein said image actuator communicates said actuator signal to said first and second image collectors via an electrical connection.

10. An assembly as recited in claim 7 wherein said image actuator communicates said actuator signal to said first and second image collectors via a wireless transmission.

11. An assembly as recited in claim 7 further comprising a third image collector.

12. An assembly as recited in claim 11 wherein said image actuator further communicates said actuator signal to said third image collector, said actuator signal causing said first, second, and third image collectors to simultaneously collect data.

13. An assembly as recited in claim 1 wherein said data storage unit is structured to receive and at least temporarily store data from said first and second image collectors.

14. An assembly as recited in claim 13 wherein said data storage unit is further structured to at least temporarily store the data collected by each of said first and second image collectors in a single data file.

15. An assembly as recited in claim 13 wherein said data storage unit is further structured to at least temporarily store the data collected by each of said first and second image collectors in separate data files.

16. An assembly as recited in claim 13 wherein said data storage unit communicatively associates with said first and second image collectors to retrieve the data collected thereby.

17. An assembly as recited in claim 16 further comprising a third image collector, said data storage unit communicatively associates with said third image collector to retrieve the data collected thereby.

18. An assembly as recited in claim 13 wherein said data storage unit further comprises a data transfer mechanism.

19. An assembly as recited in claim 18 wherein said data transfer mechanism is structured to permit access and retrieval of the data by a single viewing device.

20. An assembly as recited in claim 18 wherein said data transfer mechanism is further structured to permit access and retrieval of the data by a plurality of viewing devices via a network connection.

21. A photo identification collection assembly comprising:

a base portion, said base portion including a stage, said stage comprising a primary stage area structured to receive a first object to be viewed thereon, said stage further comprising a secondary stage area structured to receive a second object to be viewed thereon, a support member disposed in outwardly extending relation to said base portion, a first image collector disposed in engaging relation with said support member, said first image collector comprising a first lens, a second image collector disposed in engaging relation with said support member, said second image collector comprising a second lens, a third image collector disposed in engaging relation with said support member, said third image collector comprising a third lens, an image actuator communicatively associated with said first, second, and third image collectors, and a data storage unit disposed in cooperative association with said first, second, and third image collectors.

22. An assembly as recited in claim 21 wherein said outwardly extending relation is at least partially defined by at least a portion of said support member extending outward from said stage.

23. An assembly as recited in claim 21 wherein said first image collector is supported by said support member such that said first lens is disposed to at least focus on the first object positioned inside of said primary stage area.

24. An assembly as recited in claim 23 wherein said second image collector is supported by said support member such that said second lens is disposed to at least focus on the second object positioned inside of said secondary stage area.

25. An assembly as recited in claim 24 wherein said third image collector is supported by said support member such that said third lens is disposed to at least focus on a third object positioned outside of said primary and secondary stage areas.

26. An assembly as recited in claim 21 wherein said image actuator is structured to generate an actuator signal.

27. An assembly as recited in claim 26 wherein said image actuator communicates said actuator signal to each of said first, second, and third image collectors, said actuator signal causing said first, second, and third image collectors to simultaneously collect data.

28. An assembly as recited in claim 21 wherein said data storage unit is structured to receive and at least temporarily store data from said first, second, and third image collectors.

29. An assembly as recited in claim 28 wherein said data storage unit communicatively associates with said first, second, and third image collectors to retrieve the data collected thereby.

30. An assembly as recited in claim 29 wherein said data storage unit further comprises a data transfer mechanism.

31. An assembly as recited in claim 30 wherein said data transfer mechanism is structured to permit access and retrieval of data by a single viewing device.

32. An assembly as recited in claim 31 wherein said data transfer mechanism is structured to permit access and retrieval of data by a plurality of viewing devices via a network connection.

33. A photo identification collection assembly comprising:

a base portion, said base portion including a stage, a support member disposed in outwardly extending relation to said base portion, said outwardly extending relation at least partially defined by at least a portion of said support member extending outward from said stage, said stage comprising a primary alignment indicator including a primary stage area structured to support a first object thereon, and a secondary alignment indicator including a secondary stage area structured to support a second object thereon, a first image collector comprising a first lens, said first image collector supported by said support member such that said first lens is disposed to at least focus on the first object positioned inside of said primary stage area, a second image collector comprising a second lens, said second image collector supported by said support member such that said second lens is disposed to at least focus on the second object positioned inside of said secondary stage area, a third image collector comprising a third lens, said third image collector supported by said support member such that said third lens is disposed to at least focus on an object positioned outside of said primary and secondary stage areas, an image actuator structured to generate an actuator signal, said image actuator further structured to communicate said actuator signal to said first, second, and third image collectors, said actuator signal causing said first, second, and third image collectors to simultaneously collect data, a data storage unit disposed in cooperative association with said first, second, and third image collectors, said data storage unit structured to receive and at least temporarily store data from said first, second, and third image collectors, and said data storage unit comprising a data transfer mechanism, said data transfer mechanism structured to permit access and retrieval of the data by at least one viewing device.

* * * * *